(12) United States Patent
Servant (10) Patent No.: US 10,487,736 B2
(45) Date of Patent: Nov. 26, 2019

(54) PLUG FOR ROTATING INLET COWL OF A TURBO MACHINE INCLUDING AN AERODYNAMIC EXTERNAL WALL AND A CONE ATTACHMENT ELEMENT

(71) Applicant: SAFRAN AIRCRAFT ENGINES, Paris (FR)

(72) Inventor: Régis Eugène Henri Servant, Vigneux sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 37 days.

(21) Appl. No.: 15/903,249

(22) Filed: Feb. 23, 2018

(65) Prior Publication Data
US 2018/0245513 A1 Aug. 30, 2018

(30) Foreign Application Priority Data
Feb. 24, 2017 (FR) ..................................... 17 51512

(51) Int. Cl.
*F02C 7/04* (2006.01)
*B64C 11/14* (2006.01)

(52) U.S. Cl.
CPC ................. *F02C 7/04* (2013.01); *B64C 11/14* (2013.01); *F05D 2230/60* (2013.01);
(Continued)

(58) Field of Classification Search
CPC .. F02C 7/04; F02C 7/00; F01D 5/3007; F16B 35/06; F16B 37/14; F05D 2250/10;
(Continued)

(56) References Cited

U.S. PATENT DOCUMENTS 1,400,535 A * 12/1921 Flannery ................... F22B 7/16
411/374
1,401,684 A * 12/1921 Flannery ................... F22B 7/16
29/422
(Continued)

FOREIGN PATENT DOCUMENTS

EP 2096029 A2 9/2009
FR 2986046 A1 7/2013
(Continued)

OTHER PUBLICATIONS

Search Report issued in French Patent Application No. 1751512 dated Nov. 7, 2017.

*Primary Examiner* — J. Todd Newton
(74) *Attorney, Agent, or Firm* — Pearne & Gordon LLP (57) ABSTRACT

A rotating inlet cowl for a turbomachine, comprises a cone, a shell and a plug. The plug comprises an external wall with an external surface that will form an aerodynamic profile in continuity with an external surface of an external wall of the cone, when the external wall closes off a cavity that is formed between the external wall of the cone and the shell. The plug comprises an internal wall of the support and an attachment device. The attachment device is configured to pass through the support and to rigidly fix the support wall to an internal wall of the cone and the internal wall of the cone to the shell simultaneously, through an orifice in the external wall.

18 Claims, 4 Drawing Sheets

(52) U.S. Cl.
CPC .... *F05D 2250/231* (2013.01); *F05D 2250/75* (2013.01); *F05D 2260/30* (2013.01)

(58) Field of Classification Search
CPC .......... F05D 2220/32; F05D 2250/232; F05D 2220/36; F05D 2260/31; F05D 2260/30; F05D 2230/60; F05D 2250/231; F05D 2250/75; B64C 11/14
USPC .................. 416/245 R; 411/372.5, 372.6
See application file for complete search history.

(56) References Cited

U.S. PATENT DOCUMENTS

| | | | | |
|---|---|---|---|---|
| 2,968,375 | A * | 1/1961 | Avery, Sr. | B23Q 1/26 403/2 |
| 3,551,922 | A * | 1/1971 | Watson | A47K 13/26 4/236 |
| 3,703,341 | A * | 11/1972 | Garofalo | A63H 27/02 416/245 R |
| 3,799,693 | A * | 3/1974 | Hull | F02C 7/04 415/218.1 |
| 4,863,354 | A * | 9/1989 | Asselin | B64C 11/14 416/245 R |
| 5,257,905 | A * | 11/1993 | Wynn | F01D 5/026 415/122.1 |
| 5,573,378 | A * | 11/1996 | Barcza | B64C 11/14 411/175 |
| 5,788,442 | A * | 8/1998 | Eder | F16B 37/14 411/372 |
| 6,053,681 | A * | 4/2000 | Mattershead | F16B 37/14 411/14 |
| 6,447,255 | B1 * | 9/2002 | Bagnall | F01D 5/066 277/626 |
| 6,520,742 | B1 * | 2/2003 | Forrester | F01D 5/06 416/220 R |
| 7,303,377 | B2 * | 12/2007 | Rockarts | F01D 5/027 416/144 |
| 7,946,013 | B2 * | 5/2011 | Kumagai | B25B 27/00 29/255 |
| 8,215,910 | B2 * | 7/2012 | Belmonte | B64C 11/14 416/144 |
| 8,800,292 | B2 * | 8/2014 | Bottcher | F23M 5/04 60/752 |
| 8,870,508 | B2 * | 10/2014 | Hsu | F16B 37/14 411/372.5 |
| 8,985,952 | B2 * | 3/2015 | Belmonte | F01D 5/027 416/144 |
| 9,188,149 | B2 * | 11/2015 | Bennett | F16B 41/005 |
| 9,283,904 | B2 * | 3/2016 | Parenti | F16B 37/14 |
| 9,290,276 | B2 * | 3/2016 | Watanabe | B64D 45/02 |
| 9,540,939 | B2 * | 1/2017 | Maliniak | F02C 7/04 |
| 9,759,129 | B2 * | 9/2017 | Lindsey | F02C 7/04 |
| 10,155,411 | B2 * | 12/2018 | Hoff | B60B 7/16 |
| 10,227,772 | B1 * | 3/2019 | Hill | E04B 1/40 |
| 2002/0102160 | A1 * | 8/2002 | Breakwell | B64C 11/14 415/219.1 |
| 2003/0226362 | A1 * | 12/2003 | Niday | F01D 5/08 60/796 |
| 2004/0161339 | A1 * | 8/2004 | Breakwell | B64C 11/14 416/245 R |
| 2005/0095081 | A1 * | 5/2005 | Tu | F16B 37/14 411/372.6 |
| 2008/0286071 | A1 * | 11/2008 | Potter | F16B 1/0071 411/372.6 |
| 2009/0214354 | A1 * | 8/2009 | Bagnall | F01D 5/066 416/245 R |
| 2010/0051112 | A1 * | 3/2010 | Dieling | F02C 7/04 137/15.1 |
| 2010/0258199 | A1 * | 10/2010 | Schreiber | F02C 7/04 137/15.1 |
| 2010/0260605 | A1 * | 10/2010 | MacFarlane | F01D 5/027 416/144 |
| 2010/0322782 | A1 * | 12/2010 | Welch | F02C 7/04 416/244 R |
| 2012/0134843 | A1 * | 5/2012 | Bottome | F01D 5/066 416/245 R |
| 2012/0257958 | A1 * | 10/2012 | Norton | F01D 5/025 415/108 |
| 2013/0334389 | A1 * | 12/2013 | Hill | F16M 13/00 248/346.01 |
| 2013/0336743 | A1 * | 12/2013 | Hill | F16B 35/00 411/372.6 |
| 2014/0369787 | A1 * | 12/2014 | Hill | F16B 21/00 411/368 |
| 2015/0086295 | A1 * | 3/2015 | Cameron | F16B 37/14 411/429 |
| 2015/0308485 | A1 * | 10/2015 | Gallant | F16B 21/183 411/103 |
| 2015/0345315 | A1 * | 12/2015 | Orieux | F04D 29/542 415/211.2 |
| 2016/0069267 | A1 * | 3/2016 | Philbrick | F16B 39/021 416/204 A |
| 2017/0051617 | A1 * | 2/2017 | Guilbert | F01D 9/041 |
| 2017/0114800 | A1 * | 4/2017 | Burkholder | F04D 29/329 |
| 2017/0306776 | A1 * | 10/2017 | Simonds | F01D 25/243 |
| 2018/0187711 | A1 * | 7/2018 | Rao | F16B 39/12 |
| 2018/0245513 | A1 * | 8/2018 | Servant | F02C 7/04 |
| 2018/0355796 | A1 * | 12/2018 | Awasthi | F01D 5/3007 |

FOREIGN PATENT DOCUMENTS

| | | |
|---|---|---|
| GB | 2364748 A | 2/2002 |
| WO | 2016055747 A1 | 4/2016 |

* cited by examiner

PLUG FOR ROTATING INLET COWL OF A TURBO MACHINE INCLUDING AN AERODYNAMIC EXTERNAL WALL AND A CONE ATTACHMENT ELEMENT

TECHNICAL DOMAIN

The invention relates to the general technical domain of aircraft turbomachines such as turbojets and turboprops. More precisely, the invention relates to a rotating inlet cone for a turbomachine.

STATE OF PRIOR ART

Turbomachine fans include a rotating inlet cowl. The cowl comprises a cone and a shell downstream from the cone, to which the cone is fixed.

The cone comprises an external wall with an aerodynamic external surface and an internal wall extending in the downstream direction. The cone to shell attachment screws tend to disturb the air flow along the inlet cowl.

Some cowls include plugs at intervals from each other along a circumferential direction of the cone. These plugs will hold the cone to shell attachment screws, to improve the aerodynamics of the rotating cowl.

However, these plugs are often difficult to fix to the cone, they make it difficult to attach or detach the cone to the shell, and/or air circulating along the cowl remains fairly strongly disturbed aerodynamically.

PRESENTATION OF THE INVENTION

The invention is intended to at least partially solve problems encountered in solutions according to prior art.

In this context, the purpose of the invention is a rotating inlet cowl for a turbomachine. The cowl has an axis of rotation. The cowl comprises a cone, a shell downstream from the cone, and a plug.

The cone defines an upstream end of the inlet cowl. The cone comprises an external wall with an aerodynamic external surface and an internal wall extending in the downstream direction from the outside wall. The cone is configured to be fixed to the shell.

The plug comprises an external wall with an aerodynamic external surface that will form an aerodynamic profile in continuity with the external surface, by closing off a cavity formed between the external wall of the cone and the shell.

According to the invention, the plug comprises an internal wall of the support and an attachment device. The support wall is fixed to the external wall and is configured to bear on the internal wall of the cone.

The attachment device is used to tighten the support wall along a longitudinal axis of the attachment device. The attachment device comprises a screw configured to pass through the support wall, the internal wall and the shell simultaneously, to fix the support wall to the internal wall and the internal wall to the shell simultaneously. An orifice passes through the external wall through which an attachment device tightening tool is configured to pass, the passage orifice being in line with the longitudinal axis of the attachment device.

Due to the invention, the plug is fixed to the cone at the same time as the cone is fixed to the shell, while limiting aerodynamic disturbances generated by the attachment of the cone to the shell. The plug is easily and efficiently fixed to the cone, while limiting the risk of forgetting to fix the plug to the cone.

The invention may optionally include one or more of the following characteristics, that may or may not be combined with each other.

Advantageously, the general shape of the external surface and/or the internal surface is tapered.

According to one particular embodiment, the internal wall of the cone comprises a lower wall extending along the downstream direction from the external wall with an axial component, the attachment device being configured to rigidly fix the support wall to the lower wall and the lower wall to the shell simultaneously.

According to another particular embodiment, the internal wall of the cone comprises an internal rim extending along the downstream direction from the lower wall with a radial component, the attachment device being configured to rigidly fix the support wall to the internal rim and the internal rim to the shell simultaneously.

Advantageously, the shell comprises an axial wall and a radial wall connected to the axial wall downstream from the axial wall. Preferably, the lower wall of the cone is configured to bear on the axial wall. Preferably, the internal rim is configured to bear on the radial wall.

According to one advantageous embodiment, the support wall and the external wall are formed from a single part.

According to one advantageous embodiment, the cavity is configured to open up on the outside of the inlet cone through an oblong orifice of the external wall of the cone, the external wall of the plug extending in the upstream to downstream direction from an upstream segment to a downstream segment of the external wall of the cone.

According to one advantageous embodiment, the external wall is rigid. In particular, the external wall cannot be deformed as the tightening tool passes through it. Attaching to the cone to the shell and detaching it are facilitated.

Preferably, the external wall and the support wall are rigid. In particular, they cannot be deformed as the tightening tool passes through them.

According to another particular embodiment, the support wall comprises a cylindrical wall element around the longitudinal axis of the attachment device.

Advantageously, the plug comprises an intermediate wall connecting the external wall to the support wall, the intermediate wall extending with a radial component. Preferably, the intermediate wall, the support wall and the external wall form a U or V shaped housing in at least one longitudinal sectional plane of the plug.

According to one particular embodiment, the plug comprises a retaining device configured to attach the screw to the support wall so that it cannot get lost.

Preferably, the retaining device comprises a pin passing through the support wall.

Preferably, the attachment device comprises a nut configured to cooperate with the screw.

According to one particular embodiment, the plug comprises a visual physical and or/mechanical foolproofing device configured to indicate that the plug is correctly oriented relative to the cone.

According to another particular embodiment, the plug comprises a drain orifice.

According to one particular embodiment, the attachment device is oriented along a direction approximately parallel to the rotation axis of the cowl.

According to another particular embodiment, the attachment device is oriented along a direction approximately orthogonal to the direction of the rotation axis of the cowl.

According to another particular embodiment, the attachment device is oriented along a direction inclined from the direction of the rotation axis of the cowl by an angle of between 30° and 90°, preferably about 45°.

Advantageously, the attachment device is oriented to be approximately orthogonal to the aerodynamic flowstream around the cowl.

Preferably, the cowl comprises several plugs separated from each other along a circumferential direction of the cowl, at least one of the plugs being a plug like that defined above.

The invention also relates to a plug configured to close off a cavity formed between an external wall of the cone and a shell of an inlet cowl as defined above. The plug comprises an external wall, a support wall and an attachment device.

The external wall has an aerodynamic external surface that will form an aerodynamic profile with an external surface of the external wall of the cone, in aerodynamic continuity with the external surface.

The support wall is fixed to the external wall. It will bear on an internal wall of the cone that extends from the external wall of the cone in the downstream direction.

The attachment device is used to tighten the support wall along a longitudinal axis of the attachment device. The attachment device comprises a screw configured to pass through the support wall, the internal wall and the shell simultaneously, to fix the support wall to the internal wall and the internal wall to the shell simultaneously. An orifice passes through the external wall through which an attachment device tightening tool passes, the passage orifice being in line with the longitudinal axis of the attachment device.

The invention also relates to a method of attaching a cone to a shell of a cowl as defined above. The attachment method comprises:

insertion of the plug into the cavity formed between the external wall of the cone and the shell, the support wall bearing on the internal wall of the cone, the external wall of the plug closing off the cavity, and tightening of the screw of the attachment device in the cavity through the orifice of the external wall, to fix the support wall to the internal wall of the cone and the internal wall of the cone to the shell simultaneously.

BRIEF DESCRIPTION OF THE DRAWINGS

This invention will be better understood after reading the description of example embodiments given purely for information and that are in no way limitative with reference to the appended drawings on which.

DETAILED PRESENTATION OF PARTICULAR EMBODIMENTS

Identical, similar or equivalent parts of the different figures have the same numeric references to facilitate the comparison between the different figures.

Figure 1:
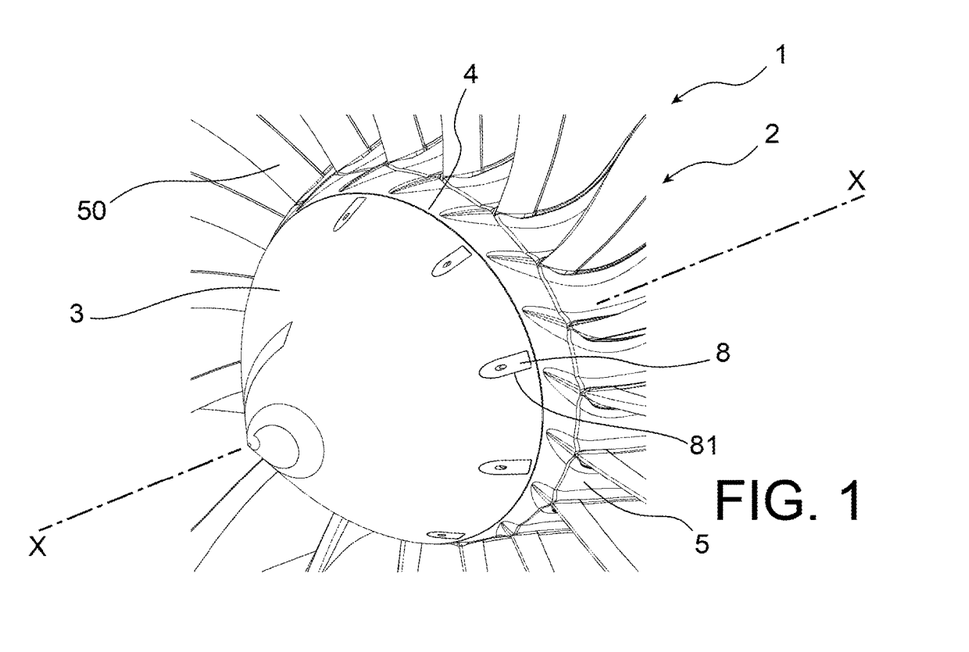
FIG. 1 is a partial diagrammatic perspective view of a fan for a turbomachine, comprising a cowl according to a first embodiment of the invention.

FIG. 1 represents a fan 2 for a turbomachine 1 of an aircraft. The turbomachine 1 is a turbojet that is in a shape of revolution about a longitudinal axis X-X of the turbomachine. The turbomachine 1 shows a twin-flow twin-spool turbomachine.

Figure 2:
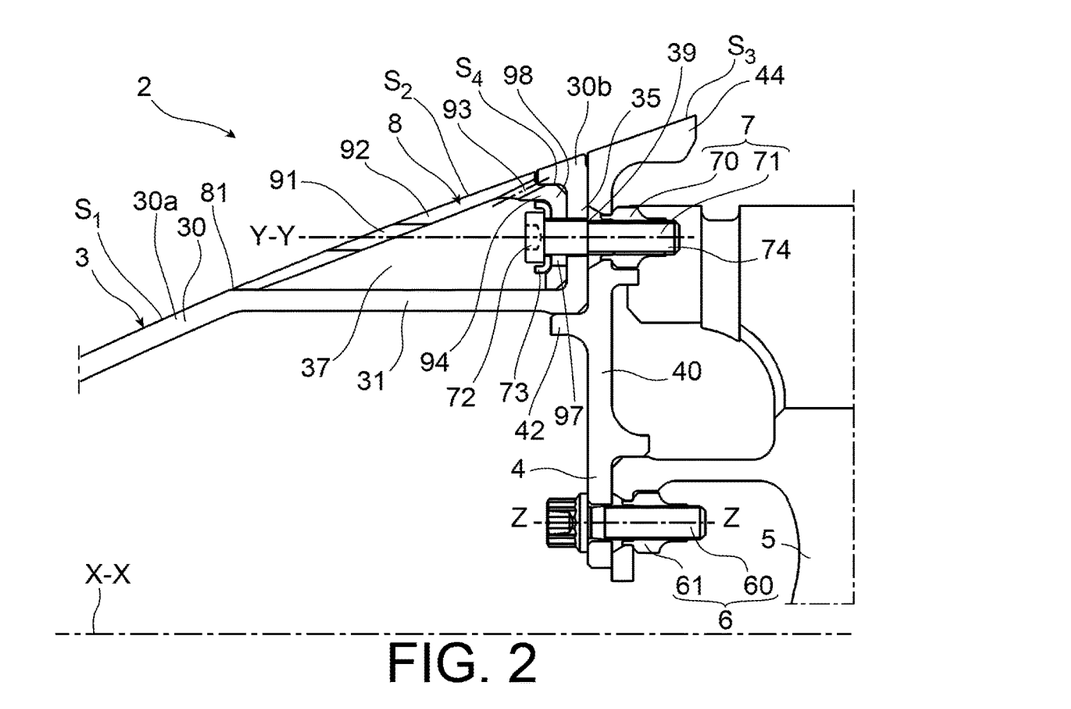
FIG. 2 is a partial diagrammatic longitudinal sectional view of the cowl according to the first embodiment.

The fan 2 comprises a cone 3 defining an upstream end of the fan 2, an upstream shell 4 located downstream from the cone 3, and a disk 5 located downstream from the shell 4 and that carries mobile blades 50 on its external surface. The cone 3 is fixed to the shell 4 by a plurality of attachment devices 7 (FIG. 2). The shell 4 is fixed to the disk 5 by a shell attachment system 6.

In this document, the upstream and downstream directions refer to the global flow of gases in the turbomachine 1, these directions are also referred to as axial. A radial direction is a direction approximately orthogonal to the turbomachine axis X-X and intersects this axis. The terms forward and aft are used as synonyms of upstream and downstream respectively.

With reference to FIGS. 1 and 2, the cone 3 and the shell 4 jointly form a rotating inlet cowl of the fan 2. The inlet cowl also comprises plugs 8, each of which will close off one of the cavities 37 opening up to the exterior of the cone 3, to improve the aerodynamic performances of the cowl.

The inlet cowl is configured to rotate around the longitudinal axis X-X of the turbomachine, while remaining fixed in rotation with the disk 5. It has a continuous external aerodynamic profile. This aerodynamic surface extends from upstream to downstream, from the cone 3 to the shell 4. The aerodynamic external surface of the cowl is generally tapered.

The shell 4 comprises an axial wall 42, a radial wall 40 attached to the axial wall 42, and a downstream wall 44 connected to the radial wall 40 and that extends in the downstream direction from the radial wall 40. The axial wall 42, the radial wall 40 and the downstream wall 44 form a single-piece wall.

The axial wall 42 projects from the radial wall 40 in the upstream direction from the radial wall 40, along an axial direction approximately parallel to the direction of the rotation axis X-X of the cowl. The axial wall 42 will centre a lower wall 31 of the cone.

The radial wall 40 extends along a radial direction approximately orthogonal to the direction of the rotation axis X-X of the cowl. The shell 4 is connected to the disk 5 by the attachment system 6 at the radial wall 40, close to a radially lower end of the radial wall 40. The radial wall 40 is configured to act as a plane bearing for the internal rim 35 of the cone. The shell 4 will also be connected to the cone 3 at the radial wall 40 by screws 60 of the attachment system 6.

The downstream wall 44 projects from the radial wall 40 radially outwards and axially in the downstream direction. The downstream wall 44 partially covers the disk 5. It comprises a tapered aerodynamic external surface $S_3$. The shell attachment system 6 comprises a plurality of attachment screws 60 each of which cooperates with a nut 61. There is an angular spacing between the attachment screws 60 along a circumferential direction of the cone. They extend through the radial wall 40 and through the disk 5 in the axial direction along a Z-Z direction that is approximately parallel to the longitudinal axis X-X of the turbomachine. Each of the nuts 61 bears on the disk 5.

With reference more specifically to FIG. 2, the cone 3 comprises an external wall 30 and an internal wall 31, 35 that extends from the external wall 30 in the downstream direction. The external wall 30 and the internal wall 31, 35 form a single piece wall.

The cone 3 delimits a plurality of cavities 37 each located between the external wall 30 and the internal wall 31, 35 and in each of which at least some of the attachment devices 7 are located, and preferably a single attachment device 7.

The external wall 30 comprises a forward segment 30a and an aft segment 30b. The forward segment 30a defines a forward end of the cone. The aft segment 30b defines an aft end of the cone.

The external wall 30 comprises an aerodynamic external surface $S_1$. The general shape of the external surface $S_1$ is tapered.

A plurality of orifices 81 located between the forward segment 30a and the aft segment 30b pass through the external wall 30. Each orifice 81 is in the general shape of an oblong hole that passes through the external wall 30 and extends approximately along the axial direction. Each oblong orifice 81 opens up into the cavity 37.

The oblong orifices 81 are separated from each other along a circumferential direction of the cone, each opening up on one of the attachment devices 7.

The internal wall 31, 35 of the cone comprises a lower wall 31 and an internal rim 35 that extends from the lower wall 31 towards the exterior of the cone. The internal wall 31, 35 is a single piece.

With reference more specifically to the first embodiment, the lower wall 31 extends from the forward segment 30a along the downstream direction, approximately parallel to the direction of the rotation axis X-X of the cowl. Each oblong orifice 81 extends along the majority of the axial length of the lower wall 31, above the lower wall 31.

The internal rim 35 extends from the lower wall 31 in the downstream direction, approximately orthogonal to the rotation axis X-X of the cone. It bears on the aft segment 30b that at least partially covers it.

The internal rim 35 is designed to be parallel to the radial wall 40 and bears on the radial wall 40. A through orifice 39 passes through it for the passage of a screw 70 of the attachment device 7.

Each cavity 37 opens up on the exterior of the cone 3 only at the oblong orifice 81. It is delimited in the upstream direction by the forward segment 30a. It is delimited in the downstream direction by the internal rim 35. It is delimited in the radial direction towards the exterior by the oblong orifice 81 and by the aft segment 30b. It is delimited in the radial direction towards the interior by the internal wall 31.

The cavities 37 are separated from each other along a circumferential direction of the cone, each housing one of the attachment devices 7.

Each of the cavities 37 will be closed off by plugs 8. Each plug 8 (FIGS. 3 and 4) comprises an external wall 92, an intermediate wall 94, 96 and an internal support wall 98 that forms a housing 9. Each plug 8 also comprises an attachment device 7 that passes through the support wall 98.

The external wall 92, the intermediate wall 94, 96 and the support wall 98 form a single-piece wall. In the first embodiment and in the fifth embodiment, the housing 9 is generally in the shape of a V in at least one longitudinal sectional plane like that shown in FIG. 2. The housing 9 is rigid.

The external wall 92 will close off one of the cavities 37 formed between the external wall 30 of the cone and the shell 4. The external wall 92 has an aerodynamic external surface $S_2$ that will form an aerodynamic profile in continuity with the external surface $S_1$. The shape of the external surface $S_2$ is tapered.

There is an orifice 91 through the external wall 92 through which an attachment device tightening tool 7 passes. The passage orifice 91 is approximately at the centre of the external wall 92. It is in line with the longitudinal axis Y-Y of the attachment device 7 that is housed in the cavity 37.

The support wall 98 bears on the internal rim 35. The support wall 98 comprises a wall element that is cylindrical about the longitudinal axis Y-Y of the attachment device. An oblong hole 97 passes through the support wall 98, inside which the screw 70 of the attachment device is located. It comprises a bearing surface $S_4$ that will bear on the internal rim 35, in the first embodiment.

Figure 3:
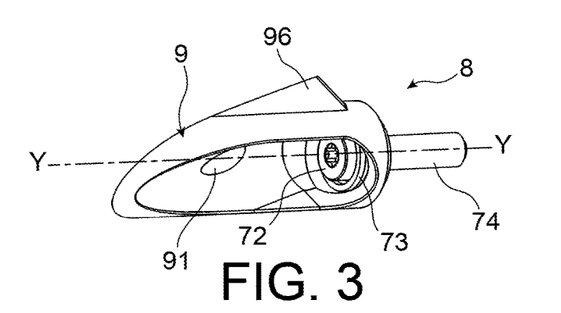
FIGS. 3 and 4 are partial diagrammatic perspective views of a plug for the cowl according to the first embodiment.
Figure 4:
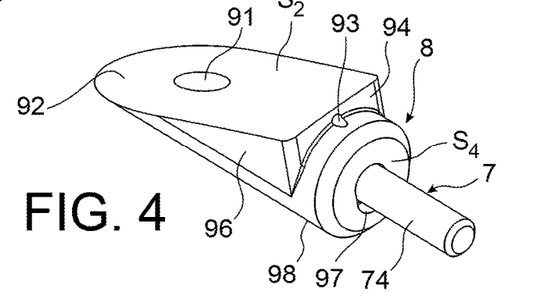

With reference to FIGS. 2 to 4, the intermediate wall 94, 96 comprises two lateral flanks 96 and a transition wall 94 orthogonal to the lateral flanks 96 and connecting them to each other.

The lateral flanks 96 are triangular in shape. They are orthogonal to the external wall 92 that they connect laterally to the support wall 98. They are approximately parallel to each other.

The section of the lateral flanks 96 varies from the upstream side to the downstream side, which informs an operator when the plug 8 is correctly oriented relative to the cone 3 and when the attachment device 7 is correctly oriented relative to the housing 9. The lateral flanks 96 thus act as a visual physical and/or mechanical foolproofing system.

The transition wall 94 extends radially downstream from the external wall 92, to connect the external wall 92 to the cylindrical support wall. An orifice 93 for drainage of the cavity 37 passes through the transition wall 94.

With reference to FIGS. 1 and 2, the attachment devices 7 are at an angular spacing from each other along a circumferential direction of the cowl, in the cavities 37. The screw 70 of each attachment device 7 will be inserted in the corresponding cavity 37 at the same time as the associated housing 9.

Each attachment device 7 comprises a screw 70 and a nut 71. The screw 70 comprises a head 72 and a shank 74.

The shank 74 of the screw extends along a longitudinal direction Y-Y. The shank 74 is configured to simultaneously pass through the support wall 98 at the oblong hole 97, the internal rim 35 at the through orifice 39 and the radial wall 40. The screw 70 fixes the support wall 98 to the internal rim 35 and the internal rim 35 to the radial wall 40 simultaneously.

The shank 74 cooperates with the nut 71 to tighten the support wall 98, the internal rim 35 and the radial wall 40 to each other, along the longitudinal axis Y-Y of the attachment device. The nut 71 bears on the radial wall 40. The attachment device 7 fixes the housing 9 to the cone 3 and also the cone 3 to the shell 4.

The screw head 72 is aligned with the orifice 91 through which a tightening tool such as a screwdriver passes so that the screw 70 can be tightened in the cavity 37 through the passage orifice 91, while the external wall 92 closes off the cavity 37.

The attachment device 7 comprises a dished washer 73 on which the head 72 bears, the dished washer 73 bearing on the support wall 98. In particular, it can be used to reconstitute the bearing surface of the screw 70 despite the presence of an oblong hole 97 and surrounding the screw head 72.

The method for attachment of the inlet cowl to the disk is described below.

Firstly, the shell 4 is fixed to the disk 5 by the shell attachment screws 60, the radial wall 40 bearing on the disk 5.

The cone 3 is then centred and bears on the shell 4, making use of visual marks to align the holes in each part.

The plug 8 comprising the housing 9, the screw 70 of the attachment device and the dished washer 73 are inserted into the cavity 37. The shank 74 of the screw extends through the through orifice 39, the screw head 72 bears on the dished washer 73, and the screw 70 is aligned with the passage orifice 91 when the plug 8 is inserted in the cavity 37.

The shank 74 is brought to be facing the through orifice 39 in the internal rim 35, through which it passes. The shank 74 then passes through the support wall 98, the internal rim 35 and the radial wall 40. The shank 74 cooperates with the nut 71, being tightened in the cavity 37 by a tightening tool that is inserted through the passage orifice 91 along the longitudinal axis Y-Y of the attachment device 7, to fix the support wall 98 to the internal rim 35 and the internal rim 35 to the axial wall 40 simultaneously. The plug 8 is then fixed to the cone 3 and the cone is fixed to the shell 4.

The method for detaching the inlet cowl from the disk is explained below.

The tightening tool of the screw 70 is inserted through the passage orifice 91 along the direction of the longitudinal axis of the attachment device Y-Y, to engage the screw head 72 and to loosen the screw 70. Once the screw 70 is loose, it is taken out of the radial wall 40 and the through orifice 39. The nut 71 remains in place bearing on the radial wall 40. The housing 9, the screw 70 and the dished washer 73 are then taken out together from the cavity 37, in other words the plug 8 is taken out of the cavity 37.

The cone 3 is then moved away from the shell 4, and the shell 4 is then moved away from the disk 5, after loosening the connection 6.

Figure 5:
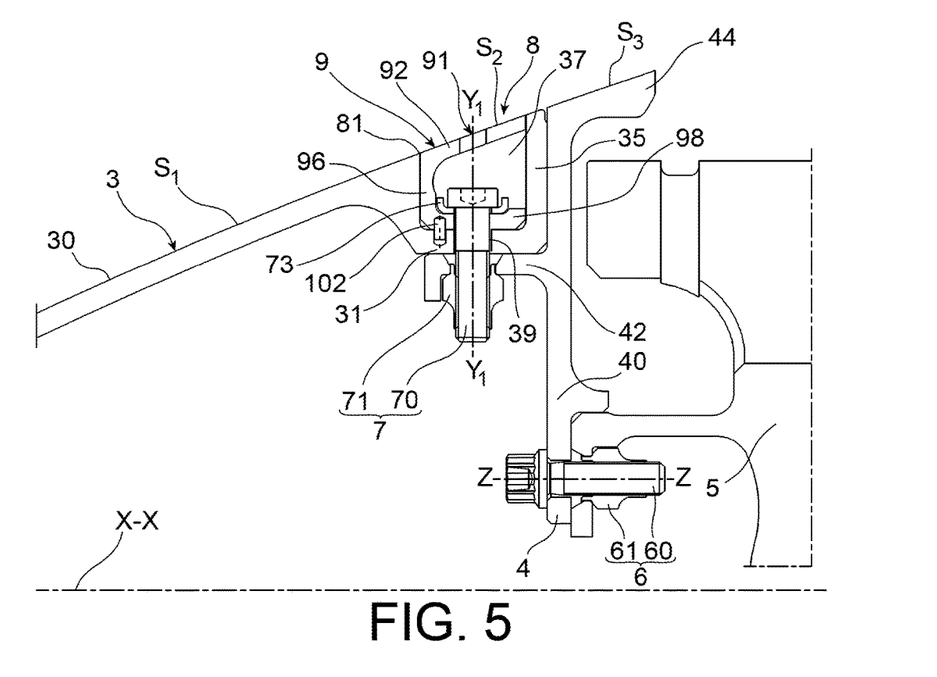
FIG. 5 is a partial diagrammatic longitudinal sectional view of a cowl according to a second embodiment of the invention.
Figure 6:
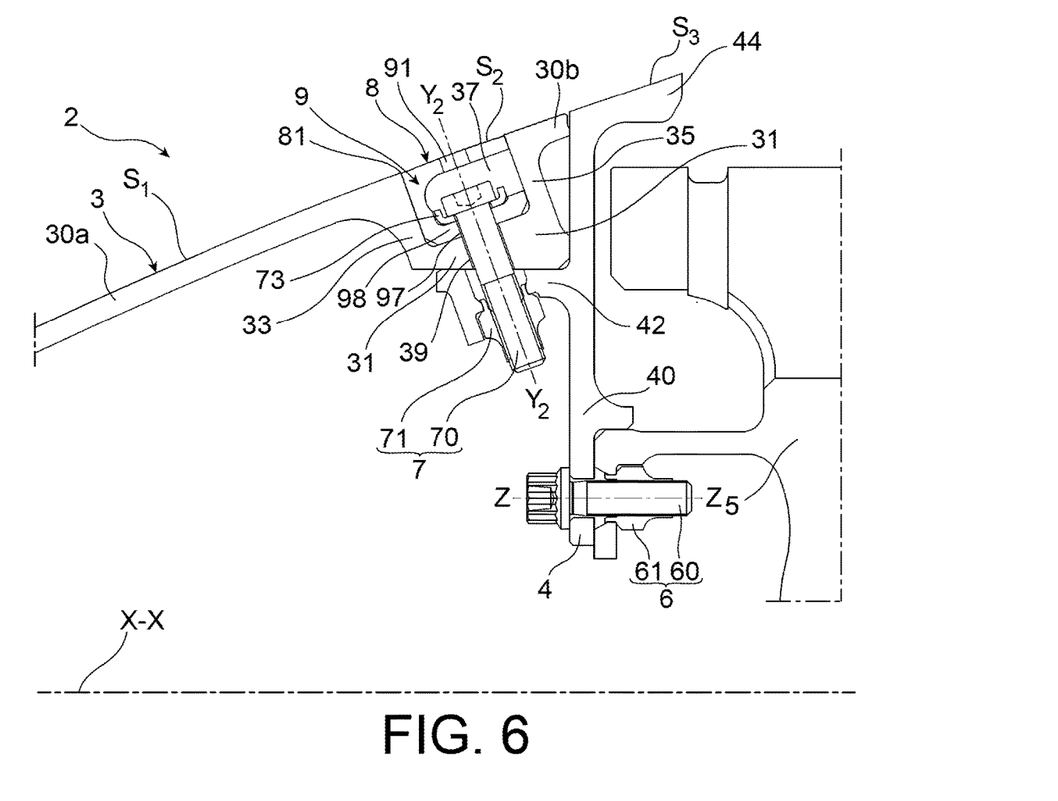
FIG. 6 is a partial diagrammatic longitudinal sectional view of a cowl according to a third embodiment of the invention.

The main differences between the cowls in the second embodiment shown on FIG. 5 and in the third embodiment shown on FIG. 6, and the cowl in the first embodiment are the shape of the cone 3, the shape of the housing 9, and the orientation of the attachment device 7.

With reference more specifically to the second embodiment, the internal wall of the cone 31, 33, 35 comprises a lower wall 31, an internal rim 35 and an intermediate wall 33 that connects the lower wall 31 to the external wall 30. The internal wall 31, 33, 35 is still a single piece.

The length of each of the orifices 81 is less than the length of the oblong orifices 81 in the first embodiment. The orifices 81 are cylindrical.

The intermediate wall 33 is inclined radially inwards and in the downstream direction relative to the forward segment 30a of the external wall 30.

The lower wall 31 extends from the intermediate wall 33 in the downstream direction, being approximately parallel to the direction of the rotation axis X-X of the cowl. The internal wall 31 extends over almost the entire axial extent of the corresponding orifice 81. A through orifice 39 passes through it for the passage of the screw 70 of the attachment device 7.

The internal rim 35 extends from the lower wall 31 in the downstream direction, orthogonal to the rotation axis X-X.

It bears on the aft segment 30b. The internal rim 35 is designed to be parallel to the radial wall 40 and bears on the radial wall 40.

Each cavity 37 opens up on the exterior of the cone 3 only at the cylindrical orifice 81. It is delimited in the upstream direction by the intermediate wall 33. It is delimited in the downstream direction by the internal rim 35. It is delimited radially outwards by the cylindrical orifice 81. It is delimited radially inwards by the internal wall 31.

The housing 9 of each plug 8 is a single piece. It comprises an external wall 92, an intermediate wall 96 and a support wall 98. In the second embodiment, the housing 9 has the general shape of a U along the longitudinal sectional plane shown on FIG. 5.

The external wall 92 will close off one of the cavities 37 formed between the external wall 30 of the cone and the shell 4. The external wall 92 has an aerodynamic external surface $S_2$ that will form an aerodynamic profile in continuity with the external surface $S_1$. The external surface $S_2$ is tapered.

There is an orifice 91 through the external wall 92 through which an attachment device tightening tool 7 passes. The passage orifice 91 is in line with the longitudinal axis $Y_1$-$Y_1$ of the attachment device 7. The passage orifice 91 is in line with the through orifice 39 along the longitudinal axis $Y_1$-$Y_1$, when the plug 8 is fixed to the cone 3. The longitudinal axis $Y_1$-$Y_1$ of the attachment device is then radially oriented while remaining approximately orthogonal to the rotation axis X-X of the cowl.

The intermediate wall 96 connects the external wall 92 to the support wall 98, extending approximately orthogonal to the support wall 98. It bears against the intermediate wall 33 of the cone, when the plug 8 closes off the cavity 37.

The support wall 98 comprises a wall element that is cylindrical around the longitudinal axis $Y_1$-$Y_1$ of the attachment device. A cylindrical hole 97 passes through the support wall 98, inside which the screw 70 of the attachment device is located. The support wall 98 bears on the lower wall 31, when the plug 8 closes off the cavity 37.

The attachment device 7 of each plug comprises a screw 70 and a nut 71. Each screw 70 comprises a head 72 and a shank 74.

The shank 74 of each screw 70 is oriented along the $Y_1$-$Y_1$ direction. The shank 74 of the screw 70 is configured to simultaneously pass through the support wall 98 at the cylindrical hole 97, the lower wall 31 at the through orifice 39 and the axial wall 42 of the shell 4. The screw 70 fixes the support wall 98 to the lower wall 31 and simultaneously the lower wall 31 to the axial wall 42.

The shank 74 cooperates with the nut 71 to tighten the support wall 98, the lower wall 31 and the axial wall 42 to each other along the longitudinal axis $Y_1$-$Y_1$ of the attachment device. The nut 71 bears on the axial wall 42. The attachment device 7 also fixes the housing 9 to the cone 3 and the cone 3 to the shell 4.

The screw head 72 is aligned with the orifice 91 through which a tightening tool such as a screwdriver passes so that the screw 70 can be tightened in the cavity 37 through the passage orifice 91, while the external wall 92 closes off the cavity. The passage orifice 91 is oriented approximately in the radial direction, such that it can act as a drainage orifice through which the cavity 37 can be drained.

Each of the lower wall 31 and the support wall 98 also comprises a blind hole into which alignment pin 102 fixed to the support 98 by shrink fitting will fit. This alignment pin 102 extends along its longitudinal direction between the lower wall 31 and the support wall 98. It extends approximately in the radial direction. It is used to position the plug 8 relative to the cone 3 to align the surface $S_2$ of the plug with the surface $S_1$ of the cone.

The differences between the cowl in the third embodiment and the cowl in the first embodiment are the shape of the internal wall 31, 33, 35 of the cone and the shape of its plugs 8.

The internal rim 35 extends from the lower wall 31 in the downstream direction remaining approximately orthogonal to the lower wall 31. The internal rim 35 is approximately parallel to the intermediate wall 33 of the cone.

At the junction between the flow stream and the internal rim 35, the housing 9 bears on the axial wall 42 and the radial wall 40.

The attachment device 7 of each plug comprises a screw 70 and a nut 71. Each screw 70 comprises a head 72 and a shank 74.

The shank 74 of each screw 70 is oriented along the longitudinal $Y_2$-$Y_2$ direction of the attachment device. The longitudinal direction $Y_2$-$Y_2$ of the attachment device is inclined from the direction of the rotation axis X-X of the cowl by an angle of between 30° and 90°, preferably about 45°.

The shank 74 of the screw 70 is configured to simultaneously pass through the support wall 98 at the cylindrical hole 97, the lower wall 31 at the through orifice 39 and the axial wall 42 of the shell 4. The screw 70 fixes the support wall 98 to the lower wall 31 and the lower wall 31 to the axial wall 42 simultaneously.

The shank 74 cooperates with the nut 71 to tighten the support wall 98, the lower wall 31 and the axial wall 42 to each other along the $Y_2$-$Y_2$ axis of the attachment device. The nut 71 bears on the axial wall 42. The attachment device 7 also fixes the housing 9 to the cone 3 and the cone 3 to the shell 4 simultaneously.

The screw head 72 is aligned with the orifice 91 through which a tightening tool such as a screwdriver passes so that the screw 70 can be tightened in the cavity 37 through the passage orifice 91, while the external wall 92 closes off the cavity 37.

Due to its installation normal to the flow stream, the surface $S_2$ can be approximated by a plane surface normal to the $Y_2$-$Y_2$ axis, or slightly spherical about the $Y_2$-$Y_2$ axis, so that the plug can be standardised. There is then no longer any need to orient the plug along the Y2-Y2 axis, and the plug does not have an alignment pin 102.

Figure 7:
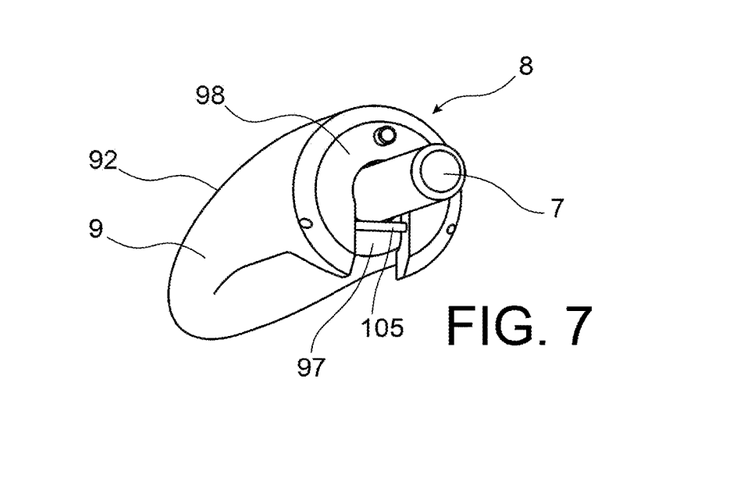
FIG. 7 is a partial diagrammatic perspective view of a plug for a cowl according to a fourth embodiment.

The difference between the plug 8 of the fourth embodiment (FIG. 7) and the plug of the first embodiment is that the former comprises a pin 105 that passes through the support wall 98. The pin 105 extends transverse to the oblong hole 97, to retain the shank 74 in the through oblong hole 97. The pin 105 forms a retaining device for the screw 70. This retaining device is configured to fix the screw 70 to the support wall 98 such that it cannot get lost, when it is assembled in the cavity 37.

The main differences between the fifth embodiment (FIGS. 8 and 9) and the first embodiment are the cylindrical shape of the housing 9 and the fact that in the fifth embodiment, the plug 8 comprises an alignment pin 102 that will position the plug 8 relative to the cone 3, to respect alignment of the flow streams.

Figure 8:
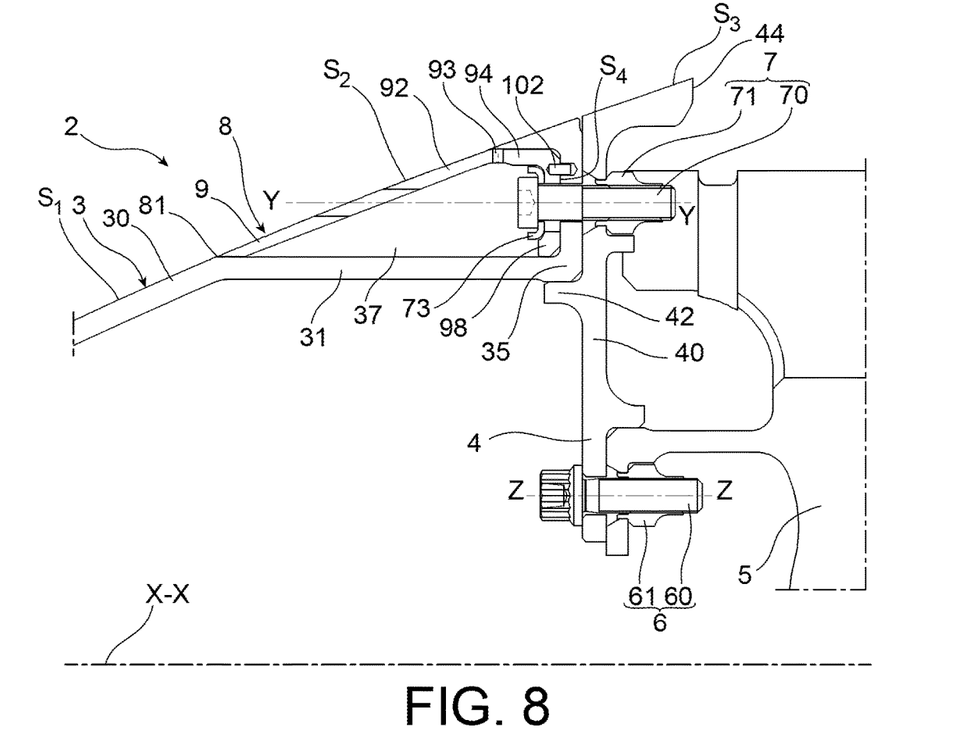
FIG. 8 is a partial diagrammatic longitudinal sectional view of a cowl according to a fifth embodiment.
Figure 9:
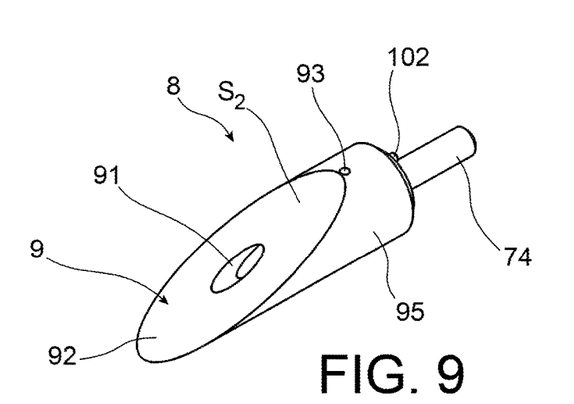
FIG. 9 is a partial diagrammatic perspective view of a plug for the cowl according to the fifth embodiment.

The alignment pin 102 is inserted in a blind hole in the support wall 98 to which it is fixed by shrink fitting. It will be inserted in a blind hole in the internal rim 35, extending along its longitudinal direction between the support wall 98 and the internal rim 35. The alignment pin is oriented approximately along the axial direction.

The intermediate wall 95 (FIG. 9) comprises a single cylindrical lateral flank 95 that is approximately orthogonal to the support wall 98. The external surface $S_2$ of the external wall 92 corresponds to a plane cutoff surface of the intermediate wall 95, which makes fabrication of the housing 9 particularly easy.

An orifice 93 for drainage of the cavity 37 passes through the intermediate wall 95.

Obviously, an expert in the subject can make various modifications to the invention as it has just been described without going outside the framework of the invention. In particular, the shape of the cone 3, the shell 4 and/or the plug 8 can vary.

The invention claimed is:

1. A rotating inlet cowl for turbomachine, wherein the rotating inlet cowl has a rotation axis and comprises:
    a cone defining an upstream end of the inlet cowl, the cone comprising an external wall with a first aerodynamic external surface, and an internal wall extending in the downstream direction from the external wall,
    a shell located downstream from the cone, wherein the cone is configured to be fixed to the shell,
    a plug comprising an external wall with a second aerodynamic external surface that is coplanar with the first aerodynamic external surface to form a continuous aerodynamic profile by closing off a cavity which is formed between the external wall of the cone and the shell,
    wherein the plug comprises:
        an internal support wall fixed to the external wall of the plug and configured to bear on the internal wall of the cone, and
        an attachment device configured to tighten the internal support wall along a longitudinal axis of the attachment device,
    wherein the attachment device comprises a screw configured to pass through the internal support wall, the internal wall of the cone and the shell simultaneously, to fix the internal support wall to the internal wall of the cone and to fix the internal wall of the cone to the shell simultaneously,
    wherein a passage orifice passes through the external wall of the plug, wherein the passage orifice is configured to permit a tool for tightening the attachment device to pass through the passage orifice, wherein the passage orifice is in line with the longitudinal axis of the attachment device.

2. The inlet cowl according to claim 1, in which the general shape of the first aerodynamic external surface and/or the second aerodynamic external surface is tapered.

3. The inlet cowl according to claim 1, in which the internal wall of the cone comprises a lower wall extending in the downstream direction from the external wall of the cone with an axial component, and an internal rim extending in the downstream direction from the internal wall of the cone with a radial component,
    the attachment device configured to rigidly fix the internal support wall to the lower wall and the lower wall to the shell simultaneously, or
    the attachment device configured to rigidly fix the internal support wall to the internal rim and the internal rim to the shell simultaneously.

4. The inlet cowl according to claim 1, in which the shell comprises an axial wall and a radial wall which is connected to the axial wall downstream from the axial wall.

5. The inlet cowl according to claim 4, wherein a lower wall of the cone is configured to bear on the axial wall, and/or wherein an inner rim of the cone is configured to bear on the radial wall.

6. The inlet cowl according to claim 1, in which the internal support wall and the external wall of the plug are made in a single piece.

7. The inlet cowl according to claim 1, in which the cavity is configured to open up on the outside of the cone through an oblong orifice of the external wall of the cone, wherein the external wall of the plug extends in the upstream to downstream direction from an upstream segment of the external wall of the cone to a downstream segment of the external wall of the cone, wherein the downstream segment is downstream of the cavity.

8. The inlet cowl according to claim 1, in which the internal support wall comprises a cylindrical wall element around the longitudinal axis of the attachment device.

9. The inlet cowl according to claim 1, in which the plug comprises an intermediate wall connecting the external wall of the plug to the internal support wall, wherein the intermediate wall extends with a radial component.

10. The inlet cowl according to claim 9, wherein the intermediate wall, the internal support wall and the external wall of the plug form a U or V shaped housing in at least one longitudinal sectional plane of the plug.

11. The inlet cowl according to claim 1, in which the plug comprises a retaining device configured to attach the screw to the internal support wall so that the attachment device cannot get lost.

12. The inlet cowl according to claim 11, wherein the retaining device comprises a pin passing through the internal support wall, and/or wherein the attachment device comprises a nut configured to cooperate with the screw.

13. The inlet cowl according to claim 1, in which the plug comprises a visual physical and/or mechanical foolproofing system configured to impose a correct orientation of the plug relative to the cone and/or in which the plug comprises a drain orifice.

14. The inlet cowl according to claim 1, in which the attachment device is oriented along a direction approximately parallel to the rotation axis of the rotating inlet cowl, or
in which the attachment device is oriented along a direction approximately orthogonal to the rotation axis of the rotating inlet cowl, or
in which the attachment device is oriented along a direction inclined from the direction of the rotation axis of the rotating inlet cowl by an angle of between 30° and 90°.

15. The inlet cowl according to claim 14, wherein the attachment device is oriented along a direction inclined from the direction of the rotation axis of the rotating inlet cowl by an angle of about 45°.

16. A plug configured to close off a cavity formed between an external wall of a cone and a shell of an inlet cowl, comprising:
an external wall with an aerodynamic external surface that is configured to be placed coplanar with a first aerodynamic external surface of the cone to form a continuous aerodynamic profile,
a support wall fixed to the external wall of the plug, that will bear on an internal wall of the cone that extends from the external wall of the cone in the downstream direction,
an attachment device configured to tighten the support wall along a longitudinal axis of the attachment device,
wherein the attachment device comprises a screw configured to pass through the support wall, the internal wall of the cone and the shell simultaneously, to fix the support wall to the internal wall of the cone and to fix the internal wall of the cone to the shell simultaneously,
wherein a passage orifice passes through the external wall of the plug, wherein a tool for tightening the attachment device is configured to pass through the passage orifice, wherein the passage orifice is in line with a longitudinal axis of the attachment device,
wherein a hole passes through the support wall, in which the screw is located.

17. The plug according to claim 16, wherein the hole in the support wall is oblong or cylindrical.

18. A method for attachment of a cone to a shell of a rotating inlet cowl for turbomachine, the rotating inlet cowl having a rotation axis and comprising:
a cone defining an upstream end of the inlet cowl, the cone comprising an external wall with a first aerodynamic external surface, and an internal wall extending in the downstream direction from the external wall,
a shell located downstream from the cone, wherein the cone is configured to be fixed to the shell,
a plug comprising an external wall with a second aerodynamic external surface that is coplanar with the first aerodynamic external surface to will form a continuous aerodynamic profile, by closing off a cavity formed between the external wall of the cone and the shell,
wherein the plug comprises:
an internal support wall fixed to the external wall of the plug and configured to bear on the internal wall of the cone, and
an attachment device configured to tighten the an internal support wall along a longitudinal axis of the attachment device,
wherein the attachment device comprises a screw configured to pass through the internal support wall, the internal wall of the cone and the shell simultaneously, to fix the internal support wall to the internal wall of the cone and to fix the internal wall of the cone to the shell simultaneously,
wherein a passage orifice passes through the external wall of the plug, wherein a tool for tightening the attachment device is configured to pass through the passage orifice, wherein the passage orifice is in line with the longitudinal axis of the attachment device,
wherein the method comprises:
insertion of the plug into the cavity which is formed between the external wall of the cone and the shell, wherein the internal support wall bears on the internal wall of the cone, wherein the external wall of the plug closes off the cavity, and
tightening of the screw of the attachment device in the cavity through the passage orifice of the external wall, to fix the internal support wall to the internal wall of the cone and the internal wall of the cone to the shell simultaneously.

* * * * *